(12) United States Patent
Kageura et al.

(10) Patent No.: US 11,961,995 B2
(45) Date of Patent: Apr. 16, 2024

(54) LITHIUM METAL COMPOSITE OXIDE POWDER, POSITIVE ELECTRODE ACTIVE SUBSTANCE FOR LITHIUM SECONDARY BATTERY, POSITIVE ELECTRODE FOR LITHIUM SECONDARY BATTERY, AND LITHIUM SECONDARY BATTERY

(71) Applicant: SUMITOMO CHEMICAL COMPANY, LIMITED, Tokyo (JP)

(72) Inventors: Jun-ichi Kageura, Niihama (JP); Daisuke Nagao, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 849 days.

(21) Appl. No.: 17/042,734

(22) PCT Filed: Mar. 27, 2019

(86) PCT No.: PCT/JP2019/013297
§ 371 (c)(1),
(2) Date: Sep. 28, 2020

(87) PCT Pub. No.: WO2019/189425
PCT Pub. Date: Oct. 3, 2019

(65) Prior Publication Data
US 2021/0098776 A1     Apr. 1, 2021

(30) Foreign Application Priority Data

Mar. 29, 2018 (JP) ................................. 2018-064749

(51) Int. Cl.
*H01M 4/134* (2010.01)
*C01G 53/00* (2006.01)
(Continued)

(52) U.S. Cl.
CPC ............ *H01M 4/134* (2013.01); *C01G 53/50* (2013.01); *H01M 4/131* (2013.01); *H01M 4/505* (2013.01);
(Continued)

(58) Field of Classification Search
None
See application file for complete search history.

(56) References Cited

U.S. PATENT DOCUMENTS

| 5,792,574 A | 8/1998 | Mitate et al. |
| 2005/0220700 A1 | 10/2005 | Suhara et al. |

(Continued)

FOREIGN PATENT DOCUMENTS

| CN | 1701451 A | 11/2005 |
| CN | 101151748 A | 3/2008 |

(Continued)

OTHER PUBLICATIONS

Speakman, Estimating Crystallize Size Using XRD, MIT Center for Materials Science and Engineering, accessed 2023, PPT slides 1-105. (Year: NA) (Year: 2023).*

(Continued)

*Primary Examiner* — Eli S Mekhlin
(74) *Attorney, Agent, or Firm* — Rimon P.C.

(57) ABSTRACT

A lithium metal composite oxide powder, which comprises primary particles and secondary particles that are aggregates of the primary particles, and has an $\alpha$-$NaFeO_2$ type crystal structure, wherein a half width (A) of a diffraction peak in a range of $2\theta=18.7\pm1°$ in a powder X-ray diffraction measurement for the lithium metal composite oxide powder (Continued)

using CuKα ray is 0.135° or more and 0.165° or less, and a c-axis lattice constant of the α-NaFeO$_2$ type crystal structure is 14.178 Å or more and 14.235 Å or less.

11 Claims, 1 Drawing Sheet

(51) Int. Cl.
  *H01M 4/02* (2006.01)
  *H01M 4/131* (2010.01)
  *H01M 4/505* (2010.01)
  *H01M 4/525* (2010.01)

(52) U.S. Cl.
  CPC ......... *H01M 4/525* (2013.01); *C01P 2002/74* (2013.01); *H01M 2004/028* (2013.01)

(56) References Cited

U.S. PATENT DOCUMENTS

| | | |
|---|---|---|
| 2009/0011334 A1 | 1/2009 | Shizuka et al. |
| 2015/0010819 A1 | 1/2015 | Lee et al. |
| 2016/0372748 A1 | 12/2016 | Nakayama et al. |
| 2017/0187031 A1 | 6/2017 | Kurita et al. |
| 2018/0175368 A1 | 6/2018 | Zhou et al. |
| 2018/0316008 A1 | 11/2018 | Arimura et al. |

FOREIGN PATENT DOCUMENTS

| | | | |
|---|---|---|---|
| CN | 106532005 A | 3/2017 | |
| EP | 1 391 950 A1 | 2/2004 | |
| EP | 1391950 A1 * | 2/2004 | ......... C01G 45/1228 |
| JP | 09-298061 A | 11/1997 | |
| JP | 2001-110419 A | 4/2001 | |
| JP | 2007-103141 A | 4/2007 | |
| JP | 2015-018803 A | 1/2015 | |
| WO | 02/086993 A1 | 10/2002 | |
| WO | 2015/008582 A1 | 1/2015 | |
| WO | 2017/078136 A1 | 5/2017 | |

OTHER PUBLICATIONS

International Search Report issued in corresponding International Patent Application No. PCT/JP2019/013297, dated Jun. 25, 2019, with English translation.
Japanese Notice of Reasons for Refusal issued in corresponding Japanese Patent Application No. 2018-064749, dated Jan. 8, 2019, with English translation.
Chinese 2nd Office Action issued in corresponding Chinese Patent Application No. 201980022041.1, dated Sep. 7, 2022, with English translation.
Chinese Office Action issued in corresponding Chinese Patent Application No. 201980022041.1, dated Apr. 24, 2022, with English translation.
Chinese Office Action issued in corresponding Chinese Patent Application No. 201980022041.1, dated Jan. 9, 2023, with English translation.
Hashem Ahmed. M. et al: "Pristine and coated LiNi1/3Mn1/3Co1/3O2 as positive electrode materials for li-ion batteries", Research on Engineering Structures and Materials, vol. 1, No. 2, Jan. 1, 2015 (Jan. 1, 2015).
Naoaki Yabuuchi et al: "Crystal Structures and Electrode Performance of Alpha-NaFeO2 for Rechargeable Sodium Batteries", Electrochemistry, vol. 80, No. 10, Oct. 5, 2012 (Oct. 5, 2012), pp. 716-719.
Extended European Search Report issued in corresponding European Patent Application No. 19775866.7-1108, dated Dec. 10, 2021.
Chen CH et al: "Aluminum-doped lithium nickel cobalt oxide electrodes for high-power lithium-ion batteries", Journal of Power Sources, Elsevier, Amsterdam, NL, vol. 128, No. 2, Apr. 5, 2004 (Apr. 5, 2004), pp. 278-285. (resubmission of reference previously cited Jan. 25, 2022 with an eligible copy).

\* cited by examiner

LITHIUM METAL COMPOSITE OXIDE POWDER, POSITIVE ELECTRODE ACTIVE SUBSTANCE FOR LITHIUM SECONDARY BATTERY, POSITIVE ELECTRODE FOR LITHIUM SECONDARY BATTERY, AND LITHIUM SECONDARY BATTERY

CROSS REFERENCE TO RELATED APPLICATIONS

This application is the U.S. National Phase under 35 U.S.C. § 371 of International Application No. PCT/JP2019/013297, filed on Mar. 27, 2019, which claims the benefit of Japanese Application No. 2018-064749, filed on Mar. 29, 2018, the entire contents of each are hereby incorporated by reference.

TECHNICAL FIELD

The present invention relates to a lithium metal composite oxide powder, a positive electrode active material for a lithium secondary battery, a positive electrode for a lithium secondary battery, and a lithium secondary battery.

Priority is claimed on Japanese Patent Application No. 2018-064749, filed on Mar. 29, 2018, the content of which is incorporated herein by reference.

DESCRIPTION OF RELATED ART

Lithium metal composite oxide powders are used as positive electrode active materials for lithium secondary batteries.

Lithium secondary batteries have already been put to practical use not only as compact power supplies for portable telephones, notebook computers and the like, but also as medium- or large-sized power supplies for automobile use, electric power storage use, etc.

Various studies have been carried out on lithium metal composite oxide powders. For example, Patent Document 1, with a view to improving the packing density and thermal, stability, describes a positive electrode active material containing nickel-based lithium transition metal oxides, which has a hexagonal crystal structure. In this positive electrode active material, the hall width of the peak of the (003) plane in the X-ray diffraction spectrum is from 0.120 to 0.125° and a c-axis length is from 14.228 to 14.229 Å.

Patent Document 2 describes an invention which, as a means of judging safety of lithium secondary battery against overcharge, specifies a half width of the (003) plane in a composite oxide including lithium and at least one transition metal element selected from the group consisting of Co, Ni, and Mn.

PRIOR ART REFERENCES

Patent Document

Patent Document 1: Japanese Unexamined Patent Application Publication No. 2015-18803
Patent Document 2: Japanese Unexamined Patent Application Publication No. 2001-110419

SUMMARY OF THE INVENTION

Problems to be Solved by the Invention

In the inventions described in the Patent Document 1 and Patent Document 2, no study is made in terms of suppression of self-discharge during long-term storage of charged batteries, and there is room for further improvement.

The present invention has been made in view of the above-mentioned circumstances, and the object of the present invention is to provide a lithium metal composite oxide powder capable of obtaining a lithium secondary battery with a low self-discharge amount, a positive electrode active material for a lithium secondary battery, a positive electrode for a lithium secondary battery, and a lithium secondary battery with a low self-discharge amount.

Means to Solve the Problems

Specifically, the present invention is as enumerated in [1] to [12] below.

[1] A lithium metal composite oxide powder, which includes primary particles and secondary particles that are aggregates of the primary particles, and has an $\alpha$-NaFeO$_2$ type crystal structure, in which a half width (A) of a diffraction peak in a range of 2 $\theta$=18.7±1° in a powder X-ray diffraction measurement for the lithium metal composite oxide powder using CuK$\alpha$ ray is 0.135° or more and 0.165° or less, and a c-axis lattice constant of the $\alpha$-NaFeO$_2$ type crystal structure is 14.178 Ø or more and 14.235 Ø or less.

[2] The lithium metal composite oxide powder according to [1], in which a half width (B) of a diffraction peak in a range of 2$\theta$=44.4±1° in the powder X-ray diffraction measurement using CuK$\alpha$ ray is 0.170° or more and 0.240° or less.

[3] The lithium metal composite oxide powder according to [1] or [2], which satisfies composition formula (I):

$$Li[Li_x(Ni_{(1-y-z-w)}Co_yMn_zM_w)_{1-x}]O_2 \quad (I)$$

in which −0.1≤x≤0.2, 0≤y≤0.4, 0≤z≤0.4, 0≤w≤0.1, y+z+w<1 and M is one or more elements selected from the group consisting of Mg, Ca, Sr, Ba, Zn, B, Ga, Ti, Zr, Ge, Fe, Cu, Cr, V, W, Mo, Sc, Y, Nb, La, Ta, Tc, Ru, Rh, Pd, Ag, Cd, In, and Sn.

[4] The lithium metal composite oxide powder according to [3], in which in the composition formula (I), 0<x≤0.2.

[5] The lithium metal composite oxide powder according to [3] or [4], in which in the composition formula (I), y+z+w is 0<y+z+w≤0.3.

[6] The lithium metal composite oxide powder according to any one of [1] to [5], further comprising single particles.

[7] The lithium metal composite oxide powder according to any one of [1] to [6], in which an amount of lithium hydroxide is 0.3% by mass or less with respect to a total mass of the lithium metal composite oxide powder, in terms of a value converted from a neutralization titration result for the lithium metal composite oxide powder.

[8] The lithium metal composite oxide powder according to any one of [1] to [7], which has an average particle, diameter (D$_{50}$) of 100 nm or more and 10 μm or less as determined by a particle size distribution measurement.

[9] The lithium metal composite oxide powder according to any one of [1] to [8], which has a minimum particle diameter (D$_{min}$) of 50 nm or more and 2 μm or less as determined by a particle size distribution measurement.

[10] A positive electrode active material for a lithium secondary battery, which includes the lithium metal composite oxide powder of any one of [1] to [9].

[11] A positive electrode for a lithium secondary battery, which includes the positive electrode active material of [10].

[12] A lithium secondary battery, which includes the positive electrode of [11].

Effect of the Invention

According to the present invention, it is possible to provide a lithium metal composite oxide powder capable of obtaining a lithium secondary battery with a low self-discharge amount, a positive electrode active material for a lithium secondary battery, a positive electrode fora lithium secondary battery, and a lithium secondary battery with a low self-discharge amount.

DESCRIPTION OF THE EMBODIMENTS

<Lithium Metal Composite Oxide Powder>

Figure 1A:
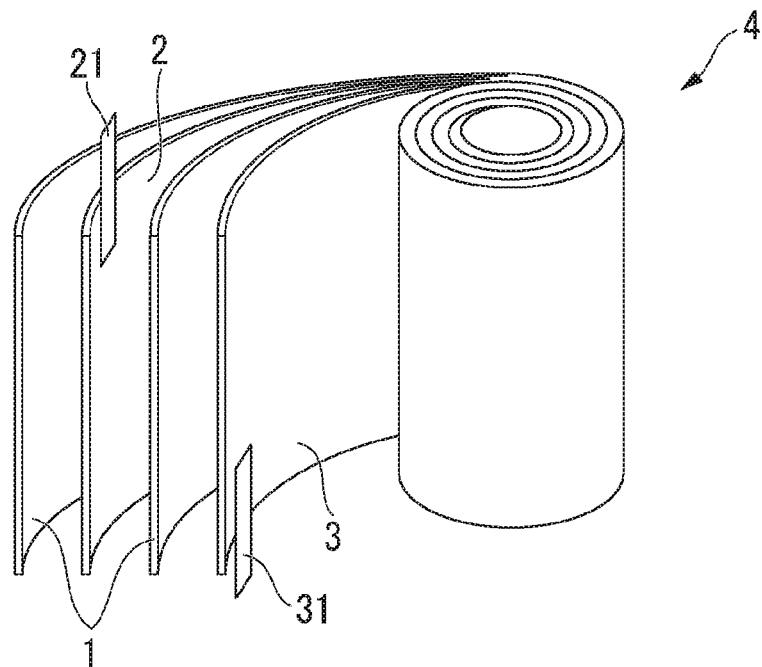
FIG. 1A is a schematic view showing one example or a lithium ion secondary battery.

The lithium metal composite oxide powder of the present embodiment relates to a lithium metal composite oxide powder, which includes primary particles and secondary particles that are aggregates of the primary particles, and has an α-NaFeO$_2$ type crystal structure, in which a half width (A) of a diffraction peak in a range of 2θ=18.7±1° in a powder X-ray diffraction measurement for the lithium metal composite oxide powder using CuKα ray is 0.135° or more and 0.165 or less, and a c-axis lattice constant of the α-NaFeO$_2$ type crystal structure is 14.178 Å or more and 14.235 Å or less.

The lithium metal composite oxide having an α-NaFeO$_2$ type crystal structure has a layered crystal structure with respective layers of lithium atoms, transition metal atoms and oxygen atoms. The minimum unit in the crystal structure is called "unit lattice". The unit lattices are connected to each other to form primary particles. A regular arrangement of unit lattices produces primary particles with high crystallinity, whereas lack of regularity in arrangement of unit lattices results in primary particles with low crystallinity. Further, the presence of a region with discontinuous connection of the unit lattices causes defects in the layered structure.

When the lithium metal composite oxide powder is used as the positive electrode active material for a lithium secondary battery, the particle surface of the lithium metal composite oxide powder is in contact with an electrolytic solution. During charging, the extraction of lithium ions occurs inside the particles of the lithium metal composite oxide powder, from the α-NaFeO$_2$ type crystal structure. The crystal structure of lithium metal composite oxide powder influences the extraction of lithium ions. In the lithium metal composite oxide powder of the present embodiment, the improvement in the stability of the charged battery has been achieved by controlling the crystal axis length of the unit lattice and the regularity of the arrangement of the unit lattices in the α-NaFeO$_2$ type crystal structure.

The half width (A) reflects the regularity of the, arrangement of the unit lattices in a layered direction along which the respective layers formed of lithium atoms, transition metal atoms, and oxygen atoms are placed one upon another in the α-NaFeO$_2$ type crystal structure. The half width (A) is 0.135° or more, preferably 0.140° or more, more preferably 0.145° or more, and even more preferably 0.150° or more. The half width (A) is 0.165° or less, preferably 0.160° or less, more preferably 0.157° or less.

The upper limit values and lower limit values can be arbitrarily combined. In the present embodiment, the half width (A) is 0.135° or more and 0.165° or less, preferably 0.140° or more and 0.165° or less, more preferably 0.145° or more and 0.160° or less, and even more preferably 0.150° or more and 0.157° or less.

The half width (A) within the above range allows the lithium metal composite oxide powder to have suitably arranged unit lattices, resulting in high stability of the crystal structure during charging.

The c-axis is the length in the layered direction along which the respective layers formed of lithium atoms, transition metal atoms, and oxygen atoms are placed one upon another in the α-NaFeO$_2$ type crystal structure. The c-axis is 14.178 Å or more, preferably 14.183 Å or more, more preferably 14.185 Å or more, and even more preferably 14 188 Å or more. The c-axis is 14.235 Å or less, preferably 14.230 Å or less, more preferably 14.227 Å or less, and even more preferably 14.225 Å or less.

The upper limit values and lower limit values can be arbitrarily combined. In the present embodiment, the c-axis is 14.178 Å or more and 14.235 Å or less, preferably 14.183 Å or more and 14.230 Å or less, more preferably 14.185 Å or more and 14.227 Å or less, and particularly preferably 14 188 Å or more and 14.225 Å or less.

The c-axis within the above range can suppress the increase in resistance of the lithium secondary battery when stored in a charged state.

The lithium metal composite oxide powder of the present embodiment has the α-NaFeO$_2$ type crystal structure, in which a half width (B) of a diffraction peak in a range of 2θ=44.4±1° in a powder X-ray diffraction measurement for the lithium metal composite oxide powder using CuKα ray is preferably 0.170° or more and 0.240° or less. The half width (B) is preferably 0.172° or more, more preferably 0.174° or more, and even more preferably 0.176° or more. The half width (B) is preferably 0.235° or less, more preferably 0.230° or less, and even more preferably 0.225° or less.

The upper limit values and Lower limit values can be arbitrarily combined.

In the present embodiment, the half width (B) is preferably 0.170° or more and 0.240° or less, more preferably 0.172° or more and 0.235° or less, even more preferably 0.174° or more and 0.230° or less, and particularly preferably 0.176° or more and 0.225° or less.

The half width (B) within the above range allows the lithium metal composite oxide powder to have suitably arranged unit lattices, resulting in high stability of the crystal structure during charging.

In the present specification, the half width (A), the c-axis, and the half width (B) can be determined from the X-ray diffraction patterns obtained by the powder X-ray diffraction measurement described in the Examples section described below. Specifically, using the X-ray analysis software (e.g., the integrated powder X-ray analysis software JADE), the half width (A) can be calculated from the diffraction peak in the range of 2θ=18.7±1° and the half width (B) can be calculated from the diffraction peak in the range of 2θ=44.4±1° from the X-ray diffraction pattern. Further, the c-axis can be calculated from the crystal structure refinement based on the hexagonal crystal structure (α-NaFeO$_2$ type structure) attributed to the space group R-3m.

<<Composition Formula (I)>>

The lithium metal composite oxide powder of, the present embodiment is preferably represented by composition formula (I) below;

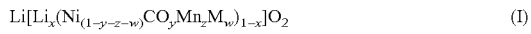

$$Li[Li_x(Ni_{(1-y-z-w)}Co_yMn_zM_w)_{1-x}]O_2 \quad (I)$$

wherein −0.1≤x≤0.2, 0≤y≤0.4, 0≤z≤0.4, 0≤w≤0.1, y+z+w<1 and M is one or more elements selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.

For obtaining a lithium secondary battery with excellent cycle performance, x in the composition formula (I) is preferably more than 0, more preferably 0.01 or more, and even more preferably 0.02 or more. For obtaining a lithium secondary battery with higher initial coulombic efficiency, x in the composition formula (I) is preferably 0.1 or less, more preferably 0.08 or less, and even more preferably 0.06 or less.

The upper limit values and lower limit values of x can be arbitrarily combined.

In the present embodiment, 0<x≤0.2 is preferable and is more 0<x≤0.1 is more preferable.

In the context of the present specification, the term "cycle performance" refers to a battery's ability to resist the capacity decrease due to repeated charge/discharge, which is defined in terms of a ratio of the capacity measured after charge/discharge to the initial capacity.

For obtaining a lithium secondary battery with higher discharge capacity, in the composition formula (I), 0<y+z+w≤0.3 is preferable, 0<y+z+w≤0.2 is more preferable, and 0<y+z+w≤0.15 is even more preferable.

For obtaining a lithium secondary battery having low internal resistance, y in the composition formula (I) is preferably 0.005 or more, more preferably 0.01 or more, and even more preferably 0.05 or more. For obtaining a lithium secondary battery with high thermal stability, y in the composition formula (I) is preferably 0.35 or less, and more preferably 0.33 or less, The upper limit values and lower limit values of y can be arbitrarily combined.

In the present embodiment, 0<y≤0.4 is preferable, and y is, more preferably 0.005 or more and 0.35 or less, even more preferably 0.01 or more and 0.35 or less, and particularly preferably 0.05 or more and 0.33 or less.

For obtaining a lithium secondary battery with higher cycle performance, z in the composition formula (I) is preferably 0.01 or more, more preferably 0.02 or more, and still more preferably 0.1 or more. For obtaining a lithium secondary battery with higher storage stability under high temperature conditions (e.g., at 60° C.), z in the composition formula (I) is preferably 0.39 or less, more preferably 0.38 or less, and even more preferably 0.35 or less.

The upper limit values and lower limit values of z can be arbitrarily combined.

For example, z is preferably 0.01 or more and 0.39 or less, more preferably 0.02 or more and 0.38 or less, and even more preferably 0.1 or more and 0.35 or less.

For obtaining a lithium secondary battery having low internal resistance, w in the composition formula (I) is preferably more than 0, more preferably 0.0005 or more, and even more preferably 0.001 or more. For obtaining a lithium secondary battery with higher discharge capacity at high current rate, w in the composition formula (I) is preferably 0.09 or less, more preferably 0.08 or less, and even more preferably 0.07 or less.

The upper limit values and, lower limit values of w can be arbitrarily combined.

For example, w is preferably more than 0 and 0.09 or less, more preferably 0.0005 or more and 0.08 or less, and even more preferably 0.001 or more and 0.07 or less.

M in the composition formula (I) is one or more elements selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.

M in the composition formula (I) is preferably at least one element selected from the group consisting of Ti, Mg. Al, W, B and Zr for obtaining a lithium secondary battery with higher cycle performance, and is preferably at least one element selected from the group consisting of Al, W, B and Zr for obtaining a lithium secondary battery with higher thermal stability.

In the present embodiment, w, x, y, and z in the composition formula (I) described above can be determined by dissolving the powder of the lithium composite metal compound in hydrochloric acid and then analyzing the resulting with an inductively coupled plasma emission spectrometer (SPS3000, manufactured by SII Nano Technology Corporation).

In the present embodiment, the lithium metal composite oxide powder preferably includes single particles.

In the present invention, the term "primary particle" means a particle that has no observable grain boundaries and is a constituent of a secondary particle.

In the present invention, the term "secondary particle" means a particle formed by aggregation of the primary particles. In other words, "secondary particle" is aggregates of the primary particles.

In the present invention, the term "single particle" means a particle that is present independently of the secondary particles, has no observable grain boundaries, and has a particle size of 0.5 μm or more. The single particle is a particle generated by the growth of a single crystal nucleus. The aspect ratio of the "single particle" is usually 1.5 or less.

The primary particles aggregate to form secondary particles and, hence, are not particles that have grown large. The particle size of the primary particle is in the range of about 0.1 μm or more and less than 0.5 μm. In the present specification, particles having a particle size of less than 0.5 μm are regarded as the primary particles and particles having a particle size of 0.5 μm or more are regarded as the single particles.

The single particles have lower surface energy and greater stability than fine primary particles and secondary particles which are aggregates of the primary particles. This presumably suppresses irreversible reactions such as decomposition of an electrolyte solution on the surface of the single particle, resulting in the lithium metal composite oxide powder that is unlikely sutler from self-discharge.

In the present embodiment, primary particles, single particles, and secondary particles can be confirmed by tire following method.

First, the lithium metal composite oxide powder is placed on a conductive sheet attached onto a sample stage, and SEM observation is carried out by radiating an electron beam with an accelerated voltage of 20 kV using a scanning electron microscope (hereinafter referred to as "SEM") (for example. JSM-5510, manufactured by JEOL Ltd.). Particles having observable grain boundaries from the SEM observation can be identified as secondary particles. Particles having no observable grain boundaries are selected in an image (SEM photograph) obtained from the SEM observation, parallel lines are drawn so as to sandwich the projection images of the particles, the largest distance between the parallel lines is measured with respect to each of the particles to determine the particle sizes of the particles. In this ease, particle having a particle size of less than 0.5 μm can be identified as the primary particle, and particle having a particle size of 0.5 μm or more can be identified as the single particle.

Further, in the present embodiment, the aspect ratio of the particles can be determined by drawing parallel lines so as to sandwich the projection images of the particles obtained from the SEM observation, measuring the largest distance and the smallest distance between the parallel lines, and dividing the largest distance by the smallest distance.

In the lithium metal composite oxide powder of the present embodiment, the amount of lithium hydroxide, in terms of a value converted from a neutralization titration result for the lithium metal composite oxide powder, with respect to the total mass of the lithium metal composite oxide powder is preferably 0.3% by mass or less, more preferably 0.25% by mass or less, particularly preferably 0.20% by mass or less, and even more preferably 0.15% by mass or less. By setting the amount of lithium hydroxide, in terms of a value converted from a neutralization titration result for the lithium metal composite oxide powder, within the above range, gas generation in the battery can be suppressed.

The amount of lithium hydroxide with respect to the total mass of the lithium metal composite oxide powder is preferably 0, usually 0.01% by mass or more, preferably 0.02% by mass or more, and more preferably 0.04% by mass or more.

The upper limit and the lower limit of the lithium hydroxide amount can be arbitrarily combined.

For example, the amount of lithium hydroxide is preferably 0% by mass or more and 0.3% by mass or less, more preferably 0.01% by mass or more and 0.20% by mass or less, and even more preferably 0.02% by mass or more and 0.15% by mass or less.

The amount of lithium hydroxide with respect to the total mass of the lithium metal composite oxide powder can be measured by the method described in the Example below.

In other words, in the lithium metal oxide powder, the lithium metal composite oxide described above is included as a main component. The lithium metal oxide powder of the present embodiment may include, in addition to the lithium metal composite oxide of the present embodiment, a small amount of impurities derived from substances used in the production process of the lithium metal composite oxide powder, such as raw materials and solvents. Examples of impurities include lithium hydroxide and lithium carbonate, as mentioned above.

In a case where the lithium metal composite oxide powder of the present embodiment includes the above impurities, the amount of the compound represented by the formula (I) above, based on the total mass of the lithium metal composite oxide powder of the present embodiment is preferably 98% by mass or more and less than 100% by mass, more preferably 99% by mass or more and less than 100% by mass, even more preferably 99.5% by mass or more and less than 100% by mass.

The particle size distribution of the lithium metal composite oxide powder is measured by laser diffraction scattering method. First, 0.1 g of the lithium metal composite oxide powder is added to 50 ml of 0.2% by mass aqueous solution of sodium hexametaphosphate, thereby obtaining a dispersion with the powder dispersed therein.

Next, the particle size distribution of the obtained dispersion is measured using a laser diffraction/scattering particle size distribution analyzer (Microtrac MT3300EXII manufactured by MicrotracBel Corporation) to obtain a volume-based cumulative particle size distribution curve.

In the obtained cumulative particle size distribution curve, with the proviso that the total volume is 100%, the particle size at a 50% cumulated volume measured from the smallest particle side is determined as the 50% cumulative volumetric particle diameter $D_{50}$ (μm), and the minimum particle size is determined as the minimum cumulative volumetric particle diameter $D_{min}$ (μm).

In the lithium metal composite oxide powder of the present embodiment, the 50% cumulative volumetric particle diameter $D_{50}$ is preferably 100 nm or more and 10 μm or less. $D_{50}$ is preferably 200 nm or more, more preferably 0.5 μm or more, and even more preferably 1 μm or more.

$D_{50}$ preferably 8 μm or less, particularly preferably 6 μm or less, and even more preferably 5 μm or less.

The upper limit values and lower limit values can be arbitrarily combined. In the present embodiment. $D_{50}$ of the lithium metal composite oxide powder is preferably 0.5 μm or more and 5.0 μm or less. By setting $D_{50}$ within the above range, when the lithium metal composite oxide powder is used as the positive electrode active material for a lithium battery, the positive electrode for lithium secondary battery with high electrode density tends to be obtained.

In the lithium metal composite oxide powder of the present embodiment, the minimum cumulative volumetric particle diameter $D_{min}$ is preferably 50 nm or more and 2 μm or less. $D_{min}$ is more preferably 100 nm or more, particularly preferably 150 nm or more, and even more preferably 200 nm or more.

$D_{min}$ is preferably 1.5 μm or less, more preferably 1.2 μm or less, and even more preferably 1.0 μm or less.

The upper limit values and lower limit values can be arbitrarily combined. In the present embodiment, $D_{min}$ of the lithium metal composite oxide powder is preferably 10 nm or more and 20 μm or less. By setting $D_{min}$ within the above range, when the lithium metal composite oxide powder is used as the positive electrode active material for a Lithium battery, irreversible reactions such as decomposition of an electrolyte solution on the positive electrode active material can be suppressed.

(Layered Structure)

In the present embodiment, the crystal structure of the lithium metal composite oxide powder has an α-$NaFeO_2$ type crystal structure. The α-$NaFeO_2$ type crystal structure is a layered structure and a hexagonal crystal structure, which is attributed to the space group R-3m.

Since the lithium metal composite oxide powder of the present embodiment has the above crystal structure, the lithium secondary battery with a high discharge capacity can be obtained.

In the lithium metal composite oxide powder of the present embodiment, c-axis length of lattice constant of the α-$NaFeO_2$ type crystal structure is within the specific range. This signifies that the lithium metal composite oxide powder is composed of a lithium metal composite oxide with a well-developed layered structure of primary particles. The c-axis length within the specific range presumably allows the extraction of lithium ions during charging and the insertion of lithium ions during discharge to proceed without disrupting the host lattice.

Further, in the lithium metal composite oxide powder of the present embodiment, the half width (A) of a diffraction peak in a range of $2\theta=18.7\pm1°$ is within the specific range. This signifies that the crystal structure of the primary particles has grown regularly and the layered structure has less defect that may become a cause of degradation.

It is presumed that the lithium metal composite oxide powder of the present embodiment having the above crystal structure shows an excellent crystal structure stability in the charged state and lithium ions are easily inserted into the crystal structure during discharge. For these reasons, it is considered that the lithium metal composite oxide powder of the present embodiment can suppress self-discharge.

The self-discharge suppression effect of the lithium metal composite oxide powder of the present embodiment can be evaluated by the self discharge rate (%) obtained according to the method described in Examples described below.

The self-discharge rate (%) of the lithium metal composite oxide powder of the present embodiment is preferably 0 to 15%, more preferably 0 to 10%, even more preferably 0 to 7%.

<Positive Electrode Active Material for Lithium Secondary Battery>

The present embodiment relates to a positive electrode active material for a lithium secondary battery, including the lithium metal composite oxide powder of the present invention described above.

<Method for Producing Lithium Metal Composite Oxide Powder>

For producing the lithium metal composite oxide powder of the present embodiment, it is preferable that a metal composite compound is first prepared, which includes essential metals other than lithium, i.e., Ni, and Co and Mn as an optional metal, and at least one optional element selected from Mg, Ca, Sr, Ba Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn, and then the metal composite compound is calcined together with a suitable lithium salt and an inert melting agent. As the metal composite compound, it is preferable to use a metal composite hydroxide or a metal composite oxide. Hereinbelow, as to one example of the method for producing the lithium metal composite oxide powder, explanations am made separately on the step of producing the metal composite compound and the step of producing the lithium metal composite oxide.

(Slop of Producing Metal Composite Compound)

The metal composite compound can be produced by the conventionally known batch co-precipitation method or continuous co-precipitation method. Hereinbelow the method for producing the metal composite compound is explained taking as an example the case of production of a metal composite hydroxide containing nickel, cobalt and manganese as metals.

First, a nickel salt solution, a cobalt salt solution, a manganese salt solution and a complexing agent are reacted by the co-precipitation method to produce a nickel-cobalt-manganese composite hydroxide represented by $Ni_{(1-y-z-w)}Co_yMn_z(OH)_2$ (wherein $0\leq y\leq 0.4$, $0\leq z\leq 0.4$, and $0\leq w\leq 0.1$. In particular, a continuous method described in Japanese Patent Unexamined Publication No. 2002-201028 can be suitably employed.

There is no particular limitation with aspect to a nickel salt as a solute in the aforementioned nickel salt solution. For example, at least one of nickel sulfate, nickel nitrate, nickel chloride and nickel acetate can be used. As a cobalt salt as a solute in the cobalt salt solution, for example, at least one of cobalt sulfate, cobalt nitrate, cobalt chloride and cobalt acetate can be used. As a manganese salt as a solute in the manganese salt solution, for example, at least one of manganese sulfate, manganese nitrate, manganese chloride and manganese acetate can be used. These metal salts are used in a ratio corresponding to the composition ratio of the aforementioned $Ni_{(1-y-z-w)}Co_yMn_z(OH)_2$. That is, the amount of each metal salt is set such that the molar ratio of nickel, cobalt, and manganese in the mixed solution containing the above metal salts matches $(1-y-z-w):y:z$ in the composition formula (I) for the lithium metal composite oxide.

As a solvent, water can be used.

The complexing agent is a substance capable of forming a complex with ions of nickel, cobalt and manganese in an aqueous solution, the examples of which include an ammonium ion donor (ammonium salts such as ammonium hydroxide, ammonium sulfate, ammonium chloride, ammonium carbonate, and ammonium fluoride), hydrazine, ethylenediaminetetraacetic acid, nitrilotriacetic acid, uracil diacetate and glycine. The complexing agent may be omitted, and when the complexing agent is used, the amount of the complexing agent contained in a mixture containing the nickel salt solution, the cobalt salt solution, the manganese salt solution, and the complexing agent is, for example, more than 0 and 2.0 or less, in terms of a molar ratio thereof relative to the total number of moles or the metal salts.

For adjusting the pH value of the aqueous solution during the precipitation, if necessary, an alkali metal hydroxide (such as sodium hydroxide or potassium hydroxide) may be added.

Successive addition of the aforementioned nickel salt solution, cobalt salt solution and manganese salt solution as well as the complexing agent to a reaction vessel allows nickel, cobalt and manganese to react with each other, resulting in the generation of a nickel-cobalt-manganese composite hydroxide. The reaction is performed with the temperature in the reaction vessel being regulated, for example, within the range of 20° C. to 80° C., preferably 30° C. to 70° C.

As for the PH value in the reaction vessel, the pH value is regulated, for example, preferably within the range of 9 to 12.5, more preferably 9.5 to 12.5. By controlling the pH within the above range, the layered structure sufficiently grows to produce the metal composite compound having a regular crystal structure. By mixing the above metal composite compound with the lithium compound, the lithium metal composite oxide powder having the specific crystal structure of the present embodiment can be obtained.

The content of the reaction vessel is appropriately stirred. With respect to the reaction vessel, one which allows the overflow for separation of the precipitated reaction product can be used.

With respect to various properties of the lithium metal composite oxide to be finally obtained as a result of carrying out the process as described below, i.e., the average particle diameter of the secondary particles, and pore radius, such properties can be regulated by appropriately controlling the concentrations of the metal salts to be supplied to the reaction vessel, agitation speed, reaction temperature, reaction PH, and calcination conditions described below, and the like. Various gases such as inert gases (e.g., nitrogen, argon and carbon dioxide), oxidizing gases (e.g., air and oxygen) or a mixture thereof may be added to the reaction vessel as well in addition to the control of the aforementioned conditions. As a substance for promoting the oxidation stale other than gases, peroxides such as hydrogen peroxide, peroxide salts such as permanganate, perchlorate, hypochlorite, nitric acid, halogen, ozone and the like can be used. As a substance for promoting the reduction state other than gases, organic acids such as oxalic acid and formic acid, sulfites, hydrazine and the like can be used.

After the reaction as described above, the resulting precipitate of the reaction product is washed with water and, then, dried, followed by isolation of a nickel-cobalt-manganese composite hydroxide as the nickel-cobalt-manganese composite compound. If necessary, the resulting reaction precipitate may be rinsed with weak acid water or an alkaline solution containing sodium hydroxide or potassium hydroxide. In the above example, a nickel-cobalt-manganese composite hydroxide is produced; however, a nickel-cobalt-manganese composite oxide may be produced by heat treatment of the nickel-cobalt-manganese composite hydroxide.

(Step for Producing Lithium Metal Composite Oxide)

After drying the metal composite compound (metal composite oxide or metal composite hydroxide), the dried product is mixed with a lithium salt such that the ratio of the number of lithium atoms with respect to the number of metal atoms contained in the metal composite oxide or metal composite hydroxide is more than 1.0. The ratio of the number of lithium atoms with respect to the number of metal atoms is preferably 1.10 or more and more preferably 1.15 or more. In the present embodiment, it is preferable that an inert melting agent is also mixed with the dried product and the lithium salt. By calcining the resulting inert melting agent-containing mixture containing the metal composite oxide or the metal composite hydroxide, the lithium salt and the inert melting agent, the mixture is allowed to be calcined in the presence of the inert melting agent. The calcination of the mixture in the presence of the inert melting agent enables suppression of the formation of secondary particles as sintered products of the primary particles. Further, the growth of the single particles can be promoted.

In the present embodiment, the drying conditions are not particularly limited, and may be, for example, any of the following conditions: conditions under which the metal composite oxide or the metal composite hydroxide is not oxidized nor reduced (i.e., conditions where an oxide remains to be an oxide, and a hydroxide remains to be a hydroxide), conditions under which the metal composite hydroxide is oxidized (i.e., conditions where a hydroxide is oxidized into an oxide), and conditions under which the metal composite oxide is reduced (i.e., conditions where an oxide is reduced into a hydroxide) For providing conditions which do not cause oxidation nor reduction, an inert gas such as nitrogen, helium or argon may be used For providing conditions which oxidize the metal composite hydroxide, oxygen or air may be used. Further, for providing conditions which reduce the metal composite oxide, a reducing agent such as hydrazine or sodium sulfite may be used in an inert gas atmosphere. As the lithium salt, any of lithium carbonate, lithium nitrate, lithium acetate, lithium hydroxide, lithium hydroxide hydrate and lithium oxide may be used individually or in the form of a mixture of two or more of these lithium salts.

Alter drying the metal composite oxide or the metal composite hydroxide, the resulting may be subjected to appropriate classification. The aforementioned lithium salt and the metal composite compound are used in respective amounts determined in view of the composition ratio of the end product. For example, when using a nickel-cobalt-manganese composite hydroxide, the lithium salt and the metal composite hydroxide are used in a ratio corresponding to the composition ratio of die composition formula (I). By calcining a mixture of the nickel-cobalt-manganese metal composite hydroxide and the lithium salt, a lithium-nickel-cobalt-manganese composite oxide can be obtained. The calcination may be carried out in dried air, an oxygen atmosphere, an inert atmosphere or the like depending on the desired composition, and may include a plurality of healing steps if necessary.

In the present embodiment, the calcination of the mixture in the presence of an inert melting agent can facilitate the crystallization reaction of the mixture. The inert melting agent may remain in the lithium metal composite oxide powder after calcination, or it may be removed by washing the mixture with a washing solution after calcination. In the present embodiment, it is preferable to wash the lithium metal composite oxide powder after calcination with pure water, an alkaline washing solution or the like.

By adjusting the holding temperature for the calcination, the particle size distribution (e.g., $D_{50}$) in the obtained lithium metal composite oxide can be controlled to rail within the preferred ranges of the present embodiment.

Normally, as the holding temperature increases, the particle size of the lithium metal composite oxide tends to increase, resulting in smaller BET specific surface area. The holding temperature in the calcination may be adjusted appropriately in view of the type of transition metal element to be used and the types and amounts of precipitant and inert melting agent.

In the present embodiment, the setting of the holding temperature can be done in consideration of the melting point of the inert melting agent described below, and it is preferable to set the holding temperature within a range of the melting point of the inert melting agent minus 100° C. or more and the melting point of the inert melting agent plus 100° C. or less.

Specifically, the holding temperature may be within a range of 200° C. to 1150° C. and is preferably within a range of 300° C. to 1050° C., and more preferably 500° C. to 1000° C.

The time for keeping the aforementioned holding temperature may be 0.1 hour or more and 20 hours or less, and is preferably 0.5 hour or more to 10 hours or less. The rate of healing up to the holding temperature is usually between 50° C./hour and 400° C./hour, and the rate of cooling down from the holding temperature to room temperature is usually between 10° C./hour and 400° C./hour. Air, oxygen, nitrogen, argon or a mixture of these gases can be used as the atmosphere for the calcination.

The lithium metal composite oxide after the calcination is pulverized and then appropriately classified, thereby obtaining a positive electrode active material applicable to a lithium secondary battery.

The inert melting agent that can be used in the present embodiment is not limited to those that are not likely to react with the mixture during the calcination. In the present embodiment, the inert melting agent may be at least one selected from the group consisting of fluoride, chloride, carbonate, sulfate, nitrate, phosphate, hydroxide, molybdate, and tungstate of at least one element (hereinafter referred to as "A") selected from the group consisting of Na, K, Rb, Cs, Ca, Mg, Sr, and Ba.

Examples of the fluoride of A include NaF (melting point: 993° C.), KF (melting point: 858° C.), RbF (melting point: 795° C.), CsF (melting point: 682° C.), $CaF_2$ (melting point: 1402° C.), $MgF_2$ (melting point: 1263° C.), $SrF_2$ (melting point: 1473° C.) and $BaF_2$ (melting point: 1355° C.).

Examples of the chloride of A include NaCl (melting point: 801° C.), KCl (melting point: 770° C.), RbCl (melting point: 718° C.), CsCl (melting point: 645° C.), CaCl$_2$ (melting point: 782° C.), MgCl$_2$ (melting point: 714° C.), SrCl$_3$ (melting point: 857° C.) and BaCl$_2$ (Melting point: 963° C.).

Examples of the carbonate of A include Na$_2$CO$_3$ (melting point: 854° C.), K$_2$CO$_3$ (melting point: 899° C.), Rb$_2$CO$_3$ (melting point: 837° C.), Cs$_2$CO$_3$ (melting point: 793° C.), CaCO$_3$ (melting point: 825° C.), MgCO$_3$ (melting point: 990° C.), SrCO$_3$ (melting point: 1497° C.) and BaCO$_3$ (melting point: 1380° C.).

Examples of the sulfate of A include Na$_2$SO$_4$ (melting point: 884° C.), K$_2$SO$_4$ (melting point: 1069° C.), Rb$_2$SO$_4$ (melting point: 1066° C.), CS$_2$SO$_4$ (melting point: 1005° C.), CaSO$_4$ (melting point: 1460° C.), MgSO$_4$ (melting point: 1137° C.), SrSO$_4$ (melting point: 1605° C.) and BaSO$_4$ (melting point: 1580° C.).

Examples of the nitrate of A include NaNO$_3$ (melting point: 310° C.), KNO$_3$ (melting point: 337° C.), RbNO$_3$ (melting point: 316° C.), CsNO$_3$ (melting point: 417° C.), Ca(NO$_3$)$_2$ (melting point: 561° C.). Mg(NO$_3$)$_2$, Sr(NO$_3$)$_2$ (melting point: 645° C.) and Ba(NO$_3$)$_2$(melting point: 596° C.).

Examples of the phosphate of A include Na$_3$PO$_4$ (melting point: 75° C.). K$_3$PO$_4$ (melting point: 1340° C.), Rb$_3$PO$_4$, Cs$_3$PO$_4$, Ca$_3$(PO$_4$)$_2$, (melting point: 1670° C.), Mg$_3$(PO$_4$)$_2$ (melting point: 1184° C.), Sr$_3$(PO$_4$)$_2$ (melting point: 1727° C.) and Ba$_3$(PO$_4$)$_2$ (meting point: 1767° C.).

Examples of the hydroxide of A include NaOH (melting point: 318° C.), KOH (melting point: 360° C.), RbOH (melting point: 301° C.), CsOH (melting point: 272° C.), Ca(OH)$_2$ (melting point: 408° C.), Mg(OH)$_2$ (melting point: 350° C.), Sr(OH)$_2$(melting point: 375° C.) and Ba(OH)$_2$ (melting point: 853° C.).

Examples of the molybdate of A include Na$_2$MoO$_4$ (melting point: 698° C.), K$_2$MoO$_4$ (melting point: 919° C.), Rb$_2$MoO$_4$ (melting point: 958° C.), Cs$_2$MoO$_4$ (melting point: 956° C.), CaMoO$_4$ (melting point: 1520° C.), MgMoO$_4$ (melting point: 1060° C.), SrMoO$_4$ (melting point: 1040° C.) and BaMoO$_4$ (melting point: 1460° C.).

Examples of the tungstate of A include Na$_2$WO$_4$ (melting point: 687° C.), K$_2$WO$_4$ (melting point: 933° C.), Rb$_2$WO$_4$, Cs$_2$WO$_4$, CaWO$_4$ (melting point: 1620° C.), MgWO$_4$, SrWO$_4$ (melting point: 1400° C.) and BaWO$_4$.

In the present embodiment, two or more of these inert melting agents may be used. When two or more inert melting agents are used, the melting point may be lowered. Further, among these inert melting agents, for obtaining a lithium metal composite oxide powder having higher crystallinity, it is preferable to use any one or combination of the hydroxide of A, the carbonate and the sulfate of A, and the chloride of A. Further, A is preferably one or both of sodium (Na) and potassium (K). That is, among the above, the inert melting agent is particularly preferably one or more selected from the group consisting of NaOH, KOH, NaCl, KCl, Na$_2$CO$_3$, K$_2$CO$_3$, Na$_2$SO$_4$, and K$_2$SO$_4$.

By using these inert melting agents, in the lithium metal composite oxide, the hall width (A) and the hall width (B) can be controlled.

In the present embodiment, when either one or both of K$_2$SO$_4$ and Na$_2$SO$_4$ is used as the inert melting agent, in the resulting lithium metal composite oxide powder, the half width (A) and the half width (13) can be controlled to fall within respective preferred ranges of the present embodiment.

In the present embodiment, the amount of the inert melting agent used during the calcination may be appropriately set. For allowing the half width (A) in the resulting lithium metal composite oxide powder to fall within the range set forth in the present embodiment, the amount of the inert melting agent to be used for calcination is preferably 0.1 part by mass or more, and more preferably 1 part by mass or more, relative to 100 parts by mass of the lithium compound. Further, if necessary, an inert melting agent other than mentioned above may be used as well. Examples of such other melting agents include ammonium salts such as NH$_4$Cl and NH$_4$F.

Pure water or an alkaline washing solution can be used for washing the inert melting agent remaining in the lithium metal composite oxide powder after calcination.

Examples of the alkaline washing solution include an aqueous solution of one or more anhydrides selected from the group consisting of LiOH (lithium hydroxide), NaOH (sodium hydroxide), KOH (potassium hydroxide), Li$_2$CO$_3$ (lithium carbonate), Na$_2$CO$_3$ (sodium carbonate), and K$_2$CO$_3$ (potassium carbonate), and (NH$_4$)$_2$CO$_3$ (ammonium carbonate), and hydrates thereof. Further, ammonia can also be used as an alkali.

The temperature of the washing solution used for washing is preferably 15° C. or less, more preferably 10° C. or less, even more preferably 8° C. or less. By controlling the temperature of the washing solution within the above range which prevents the washing solution from freezing, lithium ions can be prevented from excessively leaching from the crystal structure of the lithium metal composite oxide powder into the washing solution during washing, and the c-axis in the lithium metal composite oxide powder can be controlled to fall within the preferred range of the present embodiment.

In the washing process, examples of the method of bringing the washing solution into contact with the lithium metal composite oxide powder include a method of adding the lithium metal composite oxide powder into an aqueous washing solution and stirring the resulting, a method of showering an aqueous washing solution on the lithium metal composite oxide, and a method of adding the lithium metal composite oxide powder into the aqueous washing solution, stirring the resulting, separating the lithium metal composite oxide powder from the aqueous washing solution, and then showering an aqueous washing solution on the separated lithium metal composite oxide powder.

After washing, the lithium positive electrode active material may be separated from the washing solution by filtration or the like, and the drying step may be carried out.

<Lithium Secondary Battery>

Next, a positive electrode using the positive electrode active material (for a lithium secondary battery) including the lithium metal composite oxide powder of the present embodiment, and a lithium secondary battery including the positive electrode will be described while explaining the configuration of the lithium secondary battery.

In one example of the lithium secondary battery of the present embodiment, the lithium secondary battery includes a positive electrode, a negative electrode, a separator interposed between the positive electrode and the negative electrode, and an electrolytic solution disposed between the positive electrode and the negative electrode.

Figure 1B:
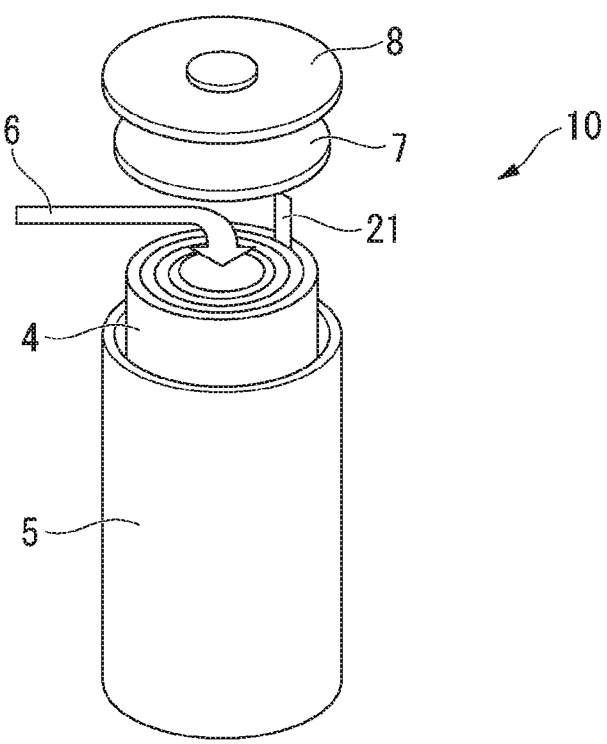
FIG. 1B is a schematic view showing one example of a lithium ion secondary battery.

Each of FIG. 1A and FIG. 1B is a schematic view illustrating an example of the lithium secondary battery of the present embodiment. A cylindrical lithium secondary battery 10 of the present embodiment is manufactured as described below.

First, as illustrated in FIG. 1A, a pair of separators 1 having a strip shape, a strip-shaped positive electrode 2 having a positive electrode lead 21 at one end, and a strip shaped negative electrode 3 having a negative electrode lead 31 at one end are laminated in an order of the separator 1, the positive electrode 2, the separator 1, and the negative electrode 3, and are wound into an electrode group 4.

Next, as illustrated in FIG. 1B, the electrode group 4 and an insulator (not shown) are placed in a battery can 5, followed by sealing the bottom of the can, and then an electrolytic solution 6 is impregnated into the electrode group 4 such that an electrolyte is disposed between the positive electrode 2 and the negative electrode 3. Further, the top section of the battery can 5 is sealed using a top insulator 7 and a sealing body 8, whereby the lithium secondary battery 10 can be produced.

The shape of the electrode group 4 may be, for example, of a columnar shape with its cross-section being round, oval, rectangular, or of a round-cornered rectangular shape, wherein the cross-section is perpendicular to the axis of winding of the electrode group 4.

As the shape of the lithium secondary battery including the aforementioned electrode group 4, it is possible to employ the shapes prescribed by IEC60086, which is the standard of batteries prescribed by the International Electrotechnical Commission (IEC), or JIS C 8500. Examples thereof include a cylindrical shape, an angular shape and the like.

The lithium secondary battery is not limited to the wound construction as described above, and may have a laminated construction obtained by laminating a positive electrode, a separator, a negative electrode, a separator, and so forth. Examples of the laminated lithium secondary battery include the so-called coin type battery, button type battery, and paper-type (or sheet-type) battery.

Hereinbelow, the respective components will be described.

(Positive Electrode)

The positive electrode of the present embodiment can be manufactured by, first, preparing a positive electrode mix including the Aforementioned positive electrode active material, a conductive material and a binder, and causing the positive electrode mix to be supported on a positive electrode current collector.

(Conductive Material)

As the conductive material included in the positive electrode of the present embodiment, a carbonaceous material can be used. Examples of the carbonaceous material include a graphite powder, a carbon black (such as acetylene black) and a fibrous carbonaceous material. Since carbon black is in the form of microparticles and has a large surface area, the addition of only a small amount of the carbon black to the positive electrode mix increases the conductivity within the positive electrode, and improves the charge/discharge efficiency and the output performance as well; however, too large an amount of carbon black deteriorates the binding strength of the binder exerted not only between the positive electrode mix and the positive electrode current collector but also within the positive electrode mix, thereby becoming an adverse factor that increases an internal resistance.

The amount of the conductive material in the positive electrode mix is preferably 5 parts by mass or more and 20 parts by mass or less, relative to 100 parts by mass of the positive electrode active material. This amount may be decreased when using a fibrous carbonaceous material such as a graphitized carbon fiber or a carbon nanotube as the conductive material.

(Binder)

As the binder included in the positive electrode of the present embodiment, a thermoplastic resin can be used.

Examples of the thermoplastic resin include fluororesins such as polyvinylidene fluoride (hereinafter also referred to as PVdF), polytetrafluoroethylene (hereinafter also referred to as PTFE), ethylene tetrafluoride-propylene hexafluoride-vinylidene fluoride type copolymers, propylene hexafluoride-vinylidene fluoride type copolymers, and ethylene tetrafluoride-perfluorovinyl ether type copolymers; and polyolefin resins such as polyethylene and polypropylene.

Two or more of these thermoplastic resins may be used in the form of a mixture thereof. When a fluororesin and a polyolefin resin are used as the hinder, it is possible to obtain a positive electrode mix capable of strong adhesive force relative to the positive electrode current collector as well as strong biding force within the positive electrode mix in itself by adjusting the ratio of the fluororesin to fall within the range of from 1% by mass to 10% by mass, and the ratio of the polyolefin resin to fall within the range of from 0.1% by mass to 2% by mass, based on the total mass of the positive electrode mix.

(Positive Electrode Current Collector)

As the positive electrode current collector included in the positive electrode of the present embodiment, it is possible to use a strip shaped member composed of a metal material such as Al, Ni, or stainless steel as a component material. It is especially preferred to use a current collector which is made of Al and is shaped into a thin film because of its high processability and low cost.

Examples of the method for causing the positive electrode mix to be supported on the positive electrode current collector include a method in which the positive electrode mix is press-formed on the positive electrode current collector. Alternatively, the positive electrode mix may be caused to be supported on the positive electrode current collector by a method including producing a paste from the positive electrode mix using an organic solvent, applying the obtained paste of the positive electrode mix to at least one surface of the positive electrode current collector, drying the paste, and press-bonding the resultant to the current collector.

Examples of the organic solvent that c an be used tor producing the paste from the positive electrode mix include amine-based solvents such as N.N-dimethylaminopropylamine and diethylene triamine; ether-based solvents such as tetrahydrofuran; ketone based solvents such as methyl ethyl ketone: ester based solvents such as methyl acetate: and amide-based solvents such as dimethyl acetamide, and N-methyl-2-pyrrolidone (hereinafter, sometimes also referred to as "NMP").

Examples of the method for applying the paste of the positive electrode mix to the positive electrode current collector include a slit die coating method, a screen coating method, a curtain coating method, a knife coating method, a gravure coating method, and an electrostatic spray method.

The positive electrode can be produced by the method as described above.

(Negative Electrode)

The negative electrode included in the lithium secondary battery of the present embodiment is not particularly limited as long as it is capable of doping and de-doping lithium ions at a potential lower than the positive electrode, and examples thereof include an electrode comprising a negative electrode current collector having supported thereon a negative electrode mix including a negative electrode active material, and an electrode constituted solely of a negative electrode active material.

(Negative Electrode Active Material)

Examples of the negative electrode active material included in the negative electrode include materials which are carbonaceous materials, chalcogen compounds (oxides, sulfides, etc.), nitrides, metals or alloys, and allow lithium ions to be doped or de-doped at a potential lower than the positive electrode.

Examples of the carbonaceous materials that can be used as the negative electrode active material include graphite such as natural graphite and artificial graphite, cokes, carbon black, pyrolytic carbons, carbon fibers, and organic macromolecular compound-sintered bodies.

Examples of oxides that can be used as the negative electrode active material include oxides of silicon represented by the formula: $SiO_x$ (wherein x is a positive integer) such as $SiO_2$ and SiO; oxides of titanium represented by the formula: $TiO_x$ (wherein x is a positive integer) such as $TiO_2$ and TiO; oxides of vanadium represented by the formula: $VO_x$ (wherein x is a positive integer) such as $V_2O_5$ and $VO_2$; oxides of iron represented by the formula: $FeO_x$ (wherein x Is a positive integer) such as $Fe_3O_4$, $Fe_2O_3$ and FeO; oxides of tin represented by the formula: $SnO_x$ (wherein x is a positive integer) such as $SnO_2$ and SnO; oxides of tungsten represented by the formula: $WO_x$ (wherein x is a positive integer) such as $WO_3$ and $WO_2$; and metal composite oxides containing lithium, titanium or vanadium such as $Li_4Ti_5O_{12}$ and $LiVO_2$.

Examples of sulfides that can be used as the negative electrode active material include sulfides of titanium represented by the formula: $TiS_x$ (wherein x is a positive integer) such as $Ti_2S_3$, $TiS_2$ and TiS; sulfides of vanadium represented by the formula: $VS_x$ (wherein x is a positive integer) such as $V_3S_4$, $VS_2$ and VS; sulfides of iron represented by the formula: $FeS_x$ (wherein x is a positive integer) such as $Fe_3S_4$, $FeS_2$ and FeS; sulfides of molebdenum represented by the formula: $MoS_x$ (wherein x is a positive integer) such as $Mo_2S_3$ and $MoS_2$; sulfides of tin represented by the formula: $SnS_x$ (wherein x is a positive integer) such as $SnS_2$ and SnS; sulfides of tungsten represented by the formula: $WS_x$ (wherein x is a positive integer) such as $WS_2$; sulfides of antimony represented by the formula: $SbS_x$ (wherein x is a positive integer) such as $Sb_2S_3$; and sulfides of selenium represented by the formula: $SeS_x$ (wherein x is a positive integer) such as $Se_5S_3$, $SeS_2$ and SeS.

Examples of nitrides that can be used as the negative electrode active material include lithium-containing nitrides such as $Li_3N$ and $Li_{3-x}A_xN$ (wherein A is one or both of Ni and Co, and 0<x<3).

Each of the aforementioned carbonaceous materials, oxides, sulfides and nitrides may be used alone or in combination, further, each of the aforementioned carbonaceous materials, oxides, sulfides and nitrides may be crystalline or amorphous.

Examples of metals that can be used as the negative electrode active material include lithium metals, silicon metals, tin metals and the like.

Examples of alloys that can be used as the negative electrode active material include lithium alloys such as Li—Al, Li—Ni, Li—Si, Li—Sn, and Li—Sn—Ni; silicon alloys such as Si—Zn: tin alloys such as Sn—Mn, Sn—Co, Sn—Ni, Sn—Cu, and Sn—La; and alloys such as $Cu_2Sb$ and $La_3Ni_2Sn_7$.

The metals or alloys are processed into, for example, a foil, and are in many cases used alone as an electrode.

Among the aforementioned negative electrode active materials, carbonaceous materials composed mainly of graphite such as natural graphite or artificial graphite are preferably used for reasons such as follows: the potential of the negative electrode hardly changes during charging from an uncharged state to a fully charged state (the potential flatness is favorable), the average discharge potential is low, the capacity retention after repeated charge/discharge cycles is high (the cycle performance is favorable), and the like. Examples of the shape of the carbonaceous material include a flake shape as in the case of natural graphite, a spherical shape as in the case of mesocarbon microbeads, a fibrous shape as in the case of a graphitized carbon fiber, an agglomerate of fine powder, etc., and the carbonaceous material may have any of these shapes.

The negative electrode mix may include a hinder as necessary. As the binder, a thermoplastic resin can be used, and examples thereof include PVdF, thermoplastic polyimides, carboxymethyl cellulose, polyethylene, and polypropylene.

(Negative Electrode Current Collector)

Examples of the negative electrode current collector included in the negative electrode include a strip-shaped member composed of a metal material such as Cu, Ni or stainless steel as a component material. Among these, it is preferred to use a current collector which is made of Cu and is shaped into a thin film, since Cu is unlikely to form an alloy with lithium and can be easily processed.

Examples of the method for causing the negative electrode mix to be supported on the above-described negative electrode current collector include, as in the case of the positive electrode, a press forming method, and a method in which a paste of the negative electrode mix obtained by using a solvent and the like, is applied to and dried on the negative electrode current collector, and the resulting is press-bonded to the current collector.

(Separator)

As the separator used in the lithium secondary battery of the present embodiment, for example, it is possible to use one that is formed of a material such as a polyolefin resin (e.g., polyethylene or polypropylene), a fluororesin or a nitrogen-containing aromatic polymer, and has a form of a porous film, a nonwoven fabric, a woven fabric or the like. The separator may be composed of two or more of the materials mentioned above, or may be formed by laminating these materials.

In the present embodiment, for satisfactory permeation of the electrolyte through the separator during the use (charge and discharge) of the battery, the separator preferably has an air resistance of 50 sec/100 cc or more and 300 sec/100 cc or less, more preferably 50 sec/100 cc or more and 200 sec/100 cc or less, as measured by the Gurley method prescribed in JIS P 8117: 2009.

The porosity of the separator is preferably 30% by volume or more and 80% by volume or less, and more preferably 40% by volume or more and 70% by volume or less. The separator may be a laminate of separators having different porosities.

(Electrolytic Solution)

The electrolytic solution used in the lithium secondary battery of the present embodiment contains an electrolyte and an organic solvent.

Examples of the electrolyte contained in the electrolytic solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein "BOB" means bis(oxalato)borate), LiFSI (wherein "FSI" means bis(fluorosulfonyl)imide), a lithium salt of a lower aliphatic carboxylic acid, and $LiAlCl_4$. Two or more of these salts may be used in the form of a mixture thereof. Among these electrolytes, it is preferred to use at least one fluorine-containing salt selected from the group consisting LiPF$_6$, LiAsF$_6$, LiSbF$_6$, LiBF$_4$, LiCF$_3$SO$_3$, LiN(SO$_2$CF$_3$), and LiC(SO$_2$CF$_3$)$_3$.

As the organic solvent included in the electrolytic solution, it is possible to use. for example, a carbonate such as propylene carbonate, ethylene carbonate, dimethyl carbonate, diethyl carbonate, ethyl methyl carbonate, 4-trifluoromethyl-1,3-dioxolane-2-one, and 1,2-di(methoxycarbonyloxy)ethane; an ether such as 1,2-dimethoxyethane, 1,3-dimethoxypropane. pentafluoropropyl methyl ether, 2,2,3,3-tetrafluoropropyl difluoromethyl ether, tetrahydrofuran, and 2-methyl tetrahydrofuran; an ester such as methyl formate, methyl acetate, and γ-butyrolactone; a nitrite such as acetonitrile acid butyronitrile; an amide such as N.N-dimethyl formamide and N,N-dimethylacetoamide; a carbamate such as 3-methyl-2-oxazolidone; a sulfur-containing compound such as sulfolane, dimethyl sulfoxide, and 1,3-propane sultone; or a solvent produced by further introducing a fluoro group into the above-described organic solvent (a solvent in which one or more hydrogen atoms included in the organic solvent is substituted by a fluorine atom).

As the organic solvent, it is preferable to use a mixture of two or more of these organic solvents. Among the aforementioned organic solvents, a solvent mixture including a carbonate is preferable, and a solvent mixture of a cyclic carbonate and a non-cyclic carbonate and a solvent mixture of a cyclic carbonate and an ether are more preferable. As the solvent mixture of a cyclic carbonate and a non-cyclic carbonate, a solvent mixture including ethylene carbonate, dimethyl carbonate, and ethyl methyl carbonate is preferable. An electrolytic solution using the aforementioned solvent mixture has many advantages such as a wider operational temperature range, a low tendency of deterioration even after charge/discharge at a high current rate, a low tendency of deterioration even when used for a long period of time, and a low decomposability even when a graphite material such as natural graphite or artificial graphite is used as the active material for the negative electrode.

For improving the stability of the obtained lithium secondary battery, it is preferable to use an electrolytic solution including a lithium salt containing fluorine such as LiPF$_6$ and an organic solvent having a fluorine substituent A solvent mixture including an ether having a fluorine substituent such as pentafluoropropyl methyl ether or 2,2,3,3-tetrafluoropropyl difluoromethyl ether and dimethyl carbonate is more preferable since a high capacity retention is achievable even when the battery is charged and discharged at a high current rate.

A solid electrolyte may be used instead of the aforementioned electrolytic solution. As the solid electrolyte, it is possible to use, for example, an organic polymer electrolyte such as a polyethylene oxide-type polymeric compound or a polymeric compound including at least one type of polymer chain selected from a polyorganosiloxane chain or a polyoxyalkylene chain. It is also possible to use the so-called gel-type electrolyte including a polymer retaining therein a non-aqueous electrolytic solution. Further, it is also possible to use an inorganic solid electrolyte including a sulfide such as Li$_2$S—SiS$_2$, Li$_2$S—GeS$_2$, Li$_2$S—P$_2$S$_5$, Li$_2$S—B$_2$S$_3$, Li$_2$S—SiS$_2$—Li$_3$PO$_4$, Li$_2$S—SiS$_2$—Li$_2$SO$_4$, and Li$_2$S—GeS$_2$—P$_2$S$_5$. Mixture of two or more of these types of inorganic solid electrolytes can be used. In some cases, the use of such a solid electrolyte may further improve the safety of the lithium secondary battery.

In the lithium secondary battery of the present embodiment, the solid electrolyte, when used, may serve as a separator. In such a case, the separator may be omitted.

EXAMPLES

Hereinbelow, the present invention will be described in more detail with reference to the Examples.

<Powder X-Ray Diffraction Measurement>

The powder X-ray diffraction measurement was performed using an X-ray diffractometer (Ultima IV manufactured by Rigaku Corporation). The powder of the lithium composite metal compound was provided in a dedicated substrate, and measurement was performed using a Cu-Kα radiation source under the conditions of a diffraction angle of 2θ=10° to 90°, a sampling width of 0.02°, and a scan speed of 4°/min to obtain a powder X-ray diffraction pattern.

Using the integrated powder X-ray analysis software JADE, the half width (A) was calculated from the diffraction peak in the range of 2θ=18.7±1° and the half width (II) was calculated from the diffraction peak in the range of 2θ=44.4±1° from the X-ray diffraction pattern. The c-axis was calculated from the crystal structure refinement based on the hexagonal crystal structure (α-NaFeO$_2$ type structure) attributed to the space group R-3m.

<Measurement of Cumulative Particle Size>

First, 0.1 g of the lithium metal composite oxide powder was added to 50 ml of 0.2% by mass aqueous solution of sodium hexametaphosphate, thereby obtaining a dispersion with the powder dispersed therein. Next, the particle size distribution of the obtained dispersion was measured using a laser diffraction/scattering particle size distribution analyzer (Microtrac MT3300EXII manufactured by Microtrac-Bel Corporation) to obtain a volume-based cumulative particle size distribution curve. In the obtained cumulative particle size distribution curve, with the proviso that the total volume is 100%, the particle size at a 50% cumulated volume measured from the smallest particle side was determined as the 50% cumulative volumetric particle diameter $D_{50}$ (μm), and the minimum particle size was determined as the minimum cumulative volumetric particle diameter $D_{min}$ (μm).

<Composition Analysis>

The composition analysis of the lithium composite metal oxide manufactured by the method described below was carried out using an inductively coupled plasma emission spectrometer (SPS3000, manufactured by SII Nano Technology Inc.) after the obtained powder of the lithium composite metal oxide was dissolved in hydrochloric acid.

<Amount of Lithium Hydroxide contained in Lithium Metal Composite Oxide Powder>

20 g of the lithium metal composite oxide powder and 100 g of pure water were placed in 100-mL beaker, and stirred for 5 minutes. Then, the lithium metal composite oxide was filtered. To 60 g of the remaining filtrate was dropwise added 0.1 mol/L hydrochloric acid, and the pH of the filtrate was measured by a pH meter. By the equation described below, the lithium hydroxide concentration contained in the lithium metal composite oxide was calculated with the titration amount of hydrochloric acid at pH=8.3±0.1 as A ml and the titration amount of hydrochloric acid at pH=4.5±0.1 as B ml.

In the equation below, the molecular weight of lithium hydroxide was calculated supposing the following atomic weights for the respective atoms: Li=6,941, C=12, and O=16.

$$\text{Lithium hydroxide amount (\% by mass)} = 0.1 \times (2A - B)/1000 \times 23.941/(20 \times 60/100) \times 100$$

<Observation of Single Particles>

The lithium metal composite oxide powder was placed on a conductive sheet attached onto a sample stage, and SEM observation was carried out by radiating an electron beam with an accelerated voltage of 20 kV using a SEM (JSM-5510, manufactured by JEOL Ltd.). From the SEM observation, particles having observable grain boundaries was confirmed as secondary particles. Particles having no observable gram boundaries were selected in an image (SEM photograph) obtained from the SEM observation, parallel lines were drawn so as to sandwich the projection images of the particles, the largest distance between the parallel lines was measured with respect to each of the particles to determine the particle sizes of the particles. In this case, particle having a particle size of less than 0.5 μm was taken as the primary particle, and particle having a particle size of 0.5 μm or more was taken as the single particle.

<<Measurement of Self-Discharge Rate>>

The self discharge rate was measured by the following method.

A lithium secondary battery (coin type cell) was fabricated using the positive electrode active material produced by the method described below. A positive electrode active material obtained by the production method described below, a conductive material (acetylene black), and a binder (PVdF) were mixed and kneaded so as to obtain a composition wherein positive electrode active material for a lithium secondary battery:conductive:material:binder=92:5:3 (mass ratio), thereby preparing a paste-like positive electrode mix.

The obtained paste-like positive electrode mix was applied to a 40 μm-thick Al foil which served as a current collector, and was dried in vacuo at 150° C. for 8 hours, thereby obtaining a positive electrode for a lithium secondary battery. The electrode area of the positive electrode for a lithium secondary battery was set to 1.65 cm$^2$.

Next, the obtained positive electrode for a lithium secondary battery was placed on a bottom lid of a coin cell for a coin-type battery R2032 (manufactured by Hohsen Corporation) with the aluminum foil surface facing downward, and a laminate film separator (including a heat-resistant porous layer laminated on a polyethylene porous film (thickness: 25 μm)) was placed on the positive electrode. 300 μl of an electrolytic solution was injected thereinto. The electrolytic solution used was prepared by dissolving LiPF$_6$ in a mixture of ethylene carbonate, dimethyl carbonate and ethyl methyl carbonate with a volume ratio of 30:35:35 such that the amount of LiPF$_6$ becomes 1.0 mol/L.

Next, metal lithium used as a negative electrode was placed on the laminate film separator, covered with a top lid through a gasket, and swaged using a swage, thereby producing a lithium secondary battery (coin-type battery R2032, hereinafter this battery may also be referred to as "coin type cell").

Further, the resulting coin type cell was tested as follows.

Specifically, charging was performed in a constant current/constant voltage mode until the current value reached 0.05 CA with a test temperature of 25° C., a maximum charge voltage of 4.35 V, and a charge current of 0.2 CA. Then, constant current discharge was performed at 25° C. with a discharge current value of 0.2 CA until the voltage decreased to 2.8 V, to measure the discharge capacity before storage.

Next, charging was performed in a constant current/constant voltage mode until the current value reached 0.05 CA with a test temperature of 25° C., a maximum charge voltage of 4.35 V, and a charge current of 0.2 CA, and then the coin type cell in a charged state were stored at a test temperature of 60° C. for 14 days. After storage, constant current discharge was performed at 25° C. with a discharge current value of 0.2 CA until the voltage decreased to 2.8 V, to measure the storage capacity. The self-discharge rate was calculated by the equation described below.

Self-discharge rate (%)=(Self-discharge capacity/Discharge capacity before storage)×100

Example 1

1. Production of Positive Electrode Active Material A1

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.88:0.08:0.04, to thereby prepare a raw material mixture solution.

Then, the obtained raw material mixture solution and an aqueous ammonium sulfate solution as a complexing agent were continuously added to the reaction vessel with stirring. An aqueous solution of sodium hydroxide was dropwise added to the reaction vessel at an appropriate liming such that the PH of the solution in the reaction vessel became 12.4. thereby obtaining nickel-cobalt-manganese composite hydroxide particles. The obtained particles were washed, dehydrated by a centrifugal separator, washed, dehydrated, separated and dried at 105° C. to obtain a nickel-cobalt-manganese composite hydroxide 1.

The nickel-cobalt-manganese composite hydroxide 1, a lithium hydroxide monohydrate powder and a potassium sulfate powder were weighed such that Li/(Ni+Co+Mn)=1.10 and K$_2$SO$_4$/(LiOH+K$_2$SO$_4$)=0.1 (mol/mol), followed by mixing. The resulting was calcined in an oxygen atmosphere at 840° C. for 10 hours, thereby obtaining a lithium metal composite oxide powder. The obtained powder and pure water adjusted to 5° C. were mixed such that the mass ratio of the powder to the resulting mixture is 0.3, thereby obtaining a slurry. The slurry was stirred for 20 minutes. followed by dehydration, rinsing with pure water which was adjusted to 5° C. and double the weight of the powder, separation, and drying at 150° C. to obtain a positive electrode active material A1.

2. Evaluation of Positive Electrode Active Material A1

The analysis result and self-discharge rate measurement result of the positive electrode active material A1 are shown in Table 1. The half width (A) of positive electrode active material A1 was 0.149°, c-axis length was 14.193 Å, and single particles that are present independently of the primary particles or secondary particles were confirmed. The self-discharge rate was 12.1%.

Example 2

1. Production of Positive Electrode Active Material A2

Into a reaction vessel equipped with a stirrer and an overflow pipe was charged water, followed by addition of an aqueous sodium hydroxide solution. The temperature of the resulting liquid was maintained at 40° C.

An aqueous nickel sulfate solution and an aqueous cobalt sulfate solution were mixed together such that the atomic ratio between nickel atoms and cobalt atoms became 0.90:0.07, to thereby prepare a raw material mixture solution.

Then, the obtained raw material mixture solution, 24.2% by mass of an aqueous aluminum sulfate solution, and an aqueous ammonium sulfate solution as a complexing agent were continuously added to the reaction vessel with stirring. The flow rate of the aqueous aluminum sulfate solution was controlled such that the atomic ratio between nickel atoms, cobalt atoms, and aluminum atoms became 0.90:0.07:0.03. An aqueous solution of sodium hydroxide was dropwise added to the reaction vessel at an appropriate timing such that the PH of the solution in the reaction vessel became 12.03, thereby obtaining nickel-cobalt-aluminum composite hydroxide particles. The obtained particles were washed, dehydrated by a centrifugal separator, washed, dehydrated, separated and dried at 105° C. to obtain a nickel-cobalt-aluminum composite hydroxide 1.

The nickel-cobalt-aluminum composite hydroxide 1, a lithium hydroxide monohydrate powder and a potassium sulfate powder were weighed such that Li/(Ni+Co+Al)=1.15 and $K_2SO_4$/(LiOH+$K_2SO_4$)=0.1 (mol/mol), followed by mixing. The resulting was calcined in an oxygen atmosphere at 760° C. for 10 hours, thereby obtaining a lithium metal composite oxide powder. The obtained powder and pure water adjusted to 5° C. were mixed such that the mass ratio of the powder to the resulting mixture is 0.3, thereby obtaining a slurry. The slurry was stirred for 10 minutes, followed by dehydration, rinsing with pure water which was adjusted to 5° C. and double the weight of the powder, separation, and drying at 150° C. to obtain a positive electrode active material A2.

2. Evaluation of Positive Electrode Active Material A2

The analysis result and self-discharge rate measurement result of the positive electrode active material A2 are shown in Table 1. The half width (A) of positive electrode active material A2 was 0.154°, c-axis length was 14.188 Å, and single particles that are present independently of the primary particles or secondary particles were confirmed. The self-discharge rate was 10.7%.

Example 3

1. Production of Positive Electrode Active Material A3

A positive electrode active material A3 was obtained following the same procedure as in Example 2, except that a nickel-cobalt-aluminum composite hydroxide 1 described in Example 2, a lithium hydroxide monohydrate powder, and a potassium sulfate powder were weighed such that Li/(Ni+Co+Al)=1.26 and $K_2SO_4$/(LiOH+$K_2SO_4$)=0.1 (mol/mol).

2. Evaluation of Positive Electrode Active Material A3

The analysis result and self-discharge rate measurement result of the positive electrode active material A3 are shown in Table 1. The half width (A) of positive electrode active material A3 was 0.152°, c-axis length was 14.188 Å, and single particles that are present independently of the primary particles or secondary particles were confirmed. The self-discharge rate was 6.9%.

Example 4

1. Production of Positive Electrode Active Material A4

A positive electrode active material A4 was obtained following the same procedure as in Example 2, except that a nickel-cobalt-aluminum composite hydroxide 1 described in Example 2 and a lithium hydroxide monohydrate powder were weighed such that Li/(Ni+Co+Al)=1.26 and $K_2SO_4$ was not added.

2. Evaluation of Positive Electrode Active Material A4

The analysis result and self-discharge rate measurement result of the positive electrode active material A4 are shown in Table 1. The half width (A) of positive electrode active material A4 was 0.156°, c-axis length was 14.187 Å, and single particles that are present independently of the primary particles or secondary particles were confirmed. The self-discharge rate was 11.9%

Example 5

1. Production of Positive Electrode Active Material A5

A positive electrode active material A5 was obtained following the same procedure as in Example 2, except that a nickel-cobalt-aluminum composite hydroxide 1 described in Example 2 and a lithium hydroxide monohydrate powder were weighed such that Li/(Ni+Co+Al)=1.46 and $K_2SO_4$ was not added.

2. Evaluation of Positive Electrode Active Material A5

The analysis result and self-discharge rate measurement result of the positive electrode active material A5 are shown in Table 1. The half width (A) of positive electrode active material A5 was 0.158°, c-axis length was 14.188 Å, and single particles that are present independently of the primary particles or secondary particles were confirmed. The self-discharge rate was 13.6%.

Example 6

1. Production of Positive Electrode Active Material A6

Into a reaction vessel equipped with a stirrer and an overflow pipe was charged water, followed by addition of an aqueous sodium hydroxide solution The temperature of the resulting liquid was maintained at 30° C.

An aqueous nickel sulfate solution, an aqueous cobalt sulfate solution and an aqueous manganese sulfate solution were mixed together such chat the atomic ratio between nickel atoms, cobalt atoms and manganese atoms became 0.60:0 20:0 20, to thereby prepare a raw material mixture solution.

Then, the obtained raw material mixture solution and an aqueous ammonium sulfate solution as a complexing agent were continuously added to the reaction vessel with stirring. An aqueous solution of sodium hydroxide was dropwise added to the reaction vessel at an appropriate timing such that the PH of the solution in the reaction vessel became 11.90, thereby obtaining nickel-cobalt-manganese composite hydroxide particles. The obtained particles were washed, dehydrated by a centrifugal separator, washed, dehydrated, separated and dried at 105° C. to obtain a nickel-cobalt-manganese composite hydroxide 2.

The nickel-cobalt-manganese composite hydroxide 2, a lithium carbonate powder and a potassium sulfate powder were weighed such that Li/(Ni+Co+Mn)=1.15 and $K_2SO_4$/($Li_2CO_3$=$K_2SO_4$)=0.1 (mol/mol), followed by mixing. The resulting was calcined in an oxygen atmosphere at 940° C. for 5 hours, thereby obtaining a lithium metal composite oxide powder. The obtained powder and pure water adjusted to 5° C. were mixed such that the mass ratio of the powder to the resulting mixture is 0.3, thereby obtaining a slurry. The slurry was stirred for 10 minutes, followed by dehydration, rinsing with pure water which was adjusted to 5° C. and double the weight of the powder, separation, and drying at 150° C. to obtain a positive electrode active material A6.

2. Evaluation of Positive Electrode Active Material A6

The analysis result and self-discharge rate measurement result of the positive electrode active material A6 are shown in table 1. The half width (A) of positive electrode active material A6 was 0.161°, c-axis length was 14.235 Å, and single particles that are present independently of the primary particles or secondary particles were confirmed. The self-discharge rate was 11.3%

Comparative Example 1

1. Production of Positive Electrode Active Material C1

The nickel-cobalt-manganese composite hydroxide 1 and a lithium hydroxide monohydrate powder were weighed such that Li/(Ni+Co+Mn)=1.10 and $K_2SO_4$ was not added, followed by mixing. The resulting was calcined in an oxygen atmosphere at 760° C. for 6 hours, thereby obtaining a lithium metal composite oxide powder. The obtained powder and pure water adjusted to 5° C. were mixed such that the mass ratio of the powder to the resulting mixture is 0.25, thereby obtaining a slurry. The slurry was stirred for 20 minutes, followed by dehydration, separation, and drying at 150° C. to obtain a positive electrode active material C1.

2. Evaluation of Positive Electrode Active Material C1

The analysis result and self-discharge rate measurement result of the positive electrode active material C1 are shown in Table 1. The half width (A) of positive electrode active material C1 was 0.180°, c-axis length was 14.196 Å, and single particles that are present independently of the primary particles or secondary particles were confirmed. The self-discharge rate was 38.1%.

Comparative Example 2

1. Production of Positive Electrode Active Material C2

The nickel-cobalt-aluminum composite hydroxide 1 and a lithium hydroxide monohydrate powder were weighed such that Li/(Ni+Co+Al)=1.26 and $K_2SO_4/(LiOH)+K_2SO_4)=0.1$ (mol/mol), followed by mixing. The resulting was calcined in an oxygen atmosphere at 780° C. for 10 hours, thereby obtaining a lithium metal composite oxide powder. The obtained powder and pure water adjusted to 25° C. were mixed such that the mass ratio of the powder to the resulting mixture is 0.3, thereby obtaining a slurry. The slurry was stirred for 10 minutes, followed by dehydration, rinsing with pure water which was adjusted to 25° C. and 10 times the weight of the powder, separation, and drying at 150° C. to obtain a positive electrode active material C2.

2. Evaluation of Positive Electrode Active Material C2

The analysis result and self-discharge rate measurement result of the positive electrode active material C2 are shown in Table 1. The half width (A) of positive electrode active material C2 was 0.132°, c-axis length was 14.178 Å, and single particles that are present independently of the primary particles or secondary particles were confirmed. The self-discharge rate was 22.2%.

Comparative Example 3

1. Production of Positive Electrode Active Material C3

Into a reaction vessel equipped with a stirrer and an overflow pipe was charged water, followed by addition of an aqueous sodium hydroxide solution. The temperature of the resulting liquid was maintained at 60° C.

An aqueous nickel sulfate solution, an aqueous cobalt sulfate solution, an aqueous manganese sulfate solution, and an aqueous aluminum sulfate were mixed together such that the atomic ratio between nickel atoms, cobalt atoms, manganese atoms, and aluminum atoms became 0.90:0.07:0.02:0.01, to thereby prepare a raw material mixture solution.

Then, the obtained raw material mixture solution and an aqueous ammonium sulfate solution as a complexing agent were continuously added to the reaction vessel with stirring. An aqueous solution of sodium hydroxide was dropwise added to the reaction vessel at an appropriate liming such that the PH of the solution in the reaction vessel became 11.35, thereby obtaining nickel-cobalt-manganese composite hydroxide particles. The obtained particles were washed, dehydrated by a centrifugal separator, washed, dehydrated, separated and dried at 105° C. to obtain a nickel-cobalt-manganese-aluminum composite hydroxide 1.

The nickel-cobalt-manganese-aluminum composite hydroxide 1 and a lithium hydroxide monohydrate powder were weighed such that Li/(Ni+Co+Mn+Al)=1.10 and $K_2SO_4$ was not added, followed by mixing. The resulting was calcined in an oxygen atmosphere at 750° C. for 10 hours, thereby obtaining a lithium metal composite oxide powder Hie obtained powder and pure water adjusted to 25° C. were mixed such that the mass ratio of the powder to the resulting mixture is 0.3, thereby obtaining a slurry. The slurry was stirred for 10 minutes, followed by dehydration, separation, and drying at 150° C. to obtain a positive electrode active material C3.

2. Evaluation of Positive Electrode Active Material C3

The analysis result and self-discharge rate measurement result of the positive electrode active material C3 are shown in Table 1. The half width (A) of positive electrode active material C3 was 0.169°, c-axis length was 14.175 Å, and single particles that are present independently of the primary particles or secondary particles were confirmed. The self-discharge rate was 16.2%.

Comparative Example 4

1. Production of Positive Electrode Active Material C4

The nickel-cobalt-manganese composite hydroxide 2 and a lithium hydroxide monohydrate powder were weighed such that Li/(Ni+Co+Mn)=1.05 and $K_2SO_4$ was not added, followed by mixing. The resulting was calcined in an oxygen atmosphere at 940° C. for 5 hours, thereby obtaining a positive electrode active material C4.

2. Evaluation of Positive Electrode Active Material C4

The analysis result and self-discharge rate measurement result of the positive electrode active material C4 are shown in Table 1. The half width (A) of positive electrode active material C4 was 0.161°, c-axis length was 14.244 Å, and single particles that are present independently of the primary particles or secondary particles were confirmed. The self-discharge rate was 17.6%.

TABLE 1

| | x | y | z | w | c-axis Å | Half Width (A) ° | Half Width (B) ° | LiOH amount % by mass | $D_{50}$ μm | $D_{min}$ | Self-Discharge Rate % |
|---|---|---|---|---|---|---|---|---|---|---|---|
| Example 1 | 0.029 | 0.078 | 0.038 | 0.000 | 14.193 | 0.149 | 0.174 | 0.02 | 4.5 | 1.1 μm | 12.1 |
| Example 2 | −0.006 | 0.069 | 0.000 | 0.027 | 14.188 | 0.154 | 0.175 | 0.06 | 5.9 | 1.1 μm | 10.7 |
| Example 3 | 0.022 | 0.069 | 0.000 | 0.027 | 14.188 | 0.152 | 0.174 | 0.10 | 4.2 | 1.1 μm | 6.9 |
| Example 4 | 0.083 | 0.069 | 0.000 | 0.027 | 14.187 | 0.156 | 0.196 | 0.07 | 4.2 | 38 nm | 11.9 |
| Example 5 | 0.129 | 0.069 | 0.000 | 0.027 | 14.188 | 0.158 | 0.197 | 0.10 | 4.3 | 38 nm | 13.6 |
| Example 6 | 0.070 | 0.198 | 0.198 | 0.000 | 14.235 | 0.161 | 0.207 | 0.01 | 6.7 | 1.5 μm | 11.3 |

TABLE 1-continued

| | x | y | z | w | c-axis Å | Half Width (A) ° | Half Width (B) ° | LiOH amount % by mass | $D_{50}$ μm | $D_{min}$ | Self-Discharge Rate % |
|---|---|---|---|---|---|---|---|---|---|---|---|
| Comparative Example 1 | 0.033 | 0.078 | 0.038 | 0.000 | 14.196 | 0.180 | 0.213 | 0.06 | 5.0 | 1.2 μm | 38.1 |
| Comparative Example 2 | 0.000 | 0.069 | 0.000 | 0.027 | 14.178 | 0.132 | 0.168 | 0.10 | 5.1 | 1.1 μm | 22.2 |
| Comparative Example 3 | 0.016 | 0.070 | 0.020 | 0.010 | 14.175 | 0.169 | 0.205 | 0.04 | 11.4 | 4.2 μm | 16.2 |
| Comparative Example 4 | 0.070 | 0.198 | 0.198 | 0.000 | 14.244 | 0.161 | 0.229 | 0.15 | 4.9 | 1.5 μm | 17.6 |

As shown in the above results, it was confirmed that the self-discharge rate was low in the positive electrode active materials applying the present invention of Examples 1 to 6.

REFERENCE SIGNS LIST

1: Separator
2: Positive electrode
3: Negative electrode
4: Electrode group
5: Battery can
6: Electrolytic liquid
7: Top insulator
8: Sealing body
10: Lithium secondary battery
21: Positive electrode lead
31: Negative electrode lead

What is claimed is:

1. A lithium metal composite oxide powder, which comprises primary particles and secondary particles that are aggregates of the primary particles, and has an α-NaFeO$_2$ type crystal structure,
wherein a half width (A) of a diffraction peak in a range of 2θ=18.7±1° in a powder X-ray diffraction measurement for the lithium metal composite oxide powder using a CuKα ray is 0.135° or more and 0.165° or less,
wherein a c-axis lattice constant of the α-NaFeO$_2$ type crystal structure is 14.178 Å or more and 14.235 Å or less,
wherein the powder X-ray diffraction measurement is performed using the CuKα ray under a condition of a diffraction angle of 2θ=10° to 90°, a sampling width of 0.02°, and a scan speed of 4°/min, and
wherein the lithium metal composite oxide powder satisfies composition formula (I)

$$Li[Li_x(Ni_{(1-y-z-w)}Co_yMn_zM_w)_{1-x}]O_2 \quad (I),$$

wherein $-0.1 \leq x \leq 0.2$, $0 \leq y \leq 0.4$, $0 \leq z \leq 0.4$, $0 \leq w \leq 0.1$, $y+z+w \leq 0.3$, and M is one or more elements selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.

2. The lithium metal composite oxide powder according to claim 1, wherein a half width (B) of a diffraction peak in a range of 2θ=44.4±1° in the powder X-ray diffraction measurement using CuKα ray is 0.170° or more and 0.240° or less.

3. The lithium metal composite oxide powder according to claim 1, wherein in the composition formula (I), $0<x\leq0.2$.

4. The lithium metal composite oxide powder according to claim 1, further comprising single particles.

5. The lithium metal composite oxide powder according to claim 1, wherein an amount of lithium hydroxide is 0.3% by mass or less with respect to a total mass of the lithium metal composite oxide powder, in terms of a value converted from a neutralization titration result for the lithium metal composite oxide powder.

6. The lithium metal composite oxide powder according to claim 1, which has an average particle diameter ($D_{50}$) of 100 nm or more and 10 μm or less as determined by a particle size distribution measurement.

7. The lithium metal composite oxide powder according to claim 1, which has a minimum particle diameter ($D_{min}$) of 50 nm or more and 2 μm or less as determined by a particle size distribution measurement.

8. A positive electrode active material for a lithium secondary battery, which comprises the lithium metal composite oxide powder of claim 1.

9. A positive electrode for a lithium secondary battery, which comprises the positive electrode active material of claim 8.

10. A lithium secondary battery, which comprises the positive electrode of claim 9.

11. The lithium metal composite oxide powder according to claim 1,
wherein the c-axis lattice constant of the α-NaFeO$_2$ type crystal structure is 14.178 Å or more and 14.193 Å or less.

* * * * *